United States Patent
Pundak et al.

(10) Patent No.: US 11,656,678 B1
(45) Date of Patent: May 23, 2023

(54) SCANNING RATE CONTROL FOR INPUT COMPONENTS BASED ON USER PRESENCE DETECTION

(71) Applicant: Microsoft Technology Licensing, LLC, Redmond, WA (US)

(72) Inventors: Gilad Pundak, Rehovot (IL); Shoham Dekel, Tel Aviv (IL); Eran Arbel, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/588,924

(22) Filed: Jan. 31, 2022

(51) Int. Cl.
*G06F 3/01* (2006.01)
*G06F 1/3231* (2019.01)
*G06F 3/041* (2006.01)

(52) U.S. Cl.
CPC ............ *G06F 3/011* (2013.01); *G06F 1/3231* (2013.01); *G06F 3/04166* (2019.05); *G06F 2203/04101* (2013.01)

(58) Field of Classification Search
None
See application file for complete search history.

(56) References Cited

U.S. PATENT DOCUMENTS

| | | |
|---|---|---|
| 10,819,920 B1 | 10/2020 | Hamlin et al. |
| 2008/0162996 A1 | 7/2008 | Krah et al. |
| 2014/0184518 A1 | 7/2014 | Valavi |
| 2017/0344094 A1 | 11/2017 | Ady et al. |
| 2018/0101250 A1 | 4/2018 | Katsurahira et al. |
| 2018/0329050 A1* | 11/2018 | Amihood .................. G01S 7/02 |
| 2018/0348843 A1 | 12/2018 | De Cesare et al. |
| 2020/0393890 A1 | 12/2020 | Hayashi et al. |
| 2021/0103333 A1 | 4/2021 | Cieplinski et al. |

OTHER PUBLICATIONS

Georganti, et al., "Speaker Distance Detection Using a Single Microphone", In Journal of IEEE Transactions on Audio, Speech, and Language Processing, vol. 19, Issue 7, Sep. 2011, pp. 1949-1961.

"International Search Report and Written Opinion Issued in PCT Application No. PCT/US22/049181", dated Feb. 27, 2023, 10 Pages.

* cited by examiner

*Primary Examiner* — Aneeta Yodichkas
(74) *Attorney, Agent, or Firm* — Holzer Patel Drennan

(57) ABSTRACT

An electronic device detects a user presence in a first distance range from a user detection sensor of an electronic device. The electronic device communicates with multiple input components, setting the electronic device to a first device state based on detecting a user presence in the first distance range. The first device state applies a scanning rate to a first input component. The electronic device also detects a user presence in a second distance range from the user detection sensor of the electronic device while the electronic device is in the first device state. The electronic device sets the electronic device to a second device state, based on detecting a user presence in the second distance range while the electronic device is in the first device state. The second device state applies a different scanning rate to the first input component than in the first device state.

20 Claims, 7 Drawing Sheets

SCANNING RATE CONTROL FOR INPUT COMPONENTS BASED ON USER PRESENCE DETECTION

BACKGROUND

An electronic device may include one or more proximity sensors to determine whether an object (e.g., a desk, a human, an electronic accessory like an electronic stylus) is in proximity to the device. For example, ambient light sensors, cameras, capacitive proximity sensors, and other light sensors can detect the proximity of a user, and based on this proximity detection, turn on or off a display.

SUMMARY

The described technology provides an electronic device that detects a user presence in a first distance range from a user detection sensor of an electronic device, the electronic device being communicatively connectable to multiple input components, sets the electronic device to a first device state, based at least in part on detecting a user presence in the first distance range, wherein the first device state applies a scanning rate to a first input component of the multiple input components, detects a user presence in a second distance range from the user detection sensor of the electronic device, while the electronic device is in the first device state, and sets the electronic device to a second device state, based at least in part on detecting a user presence in the second distance range while the electronic device is in the first device state, wherein the second device state applies a different scanning rate to the first input component than in the first device state.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
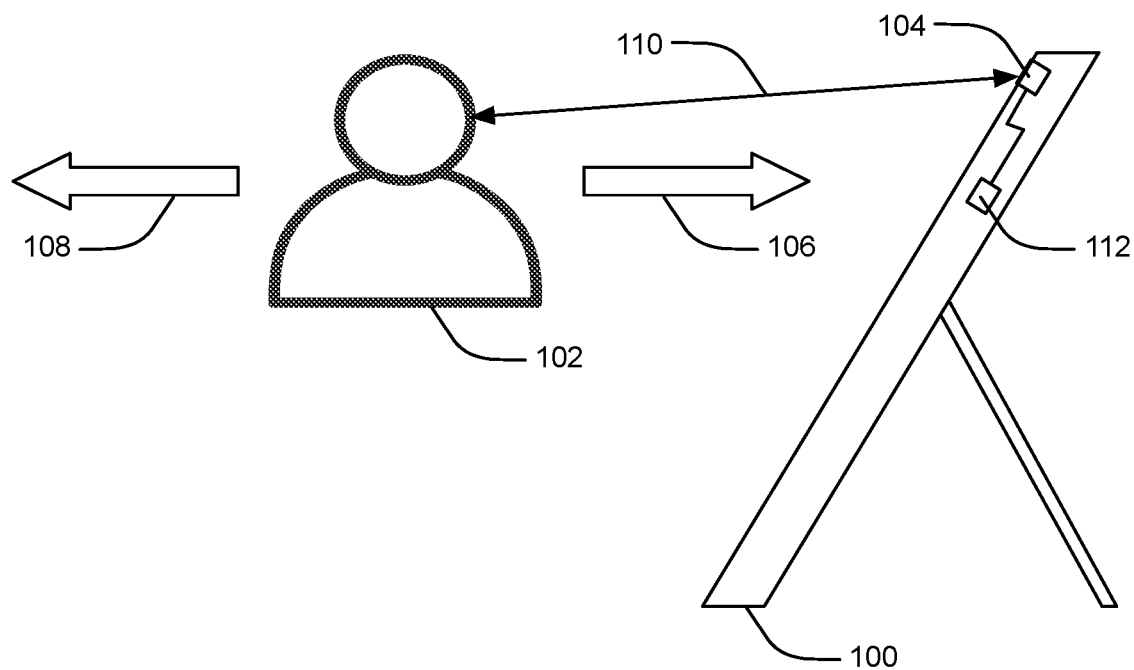
FIG. 1 illustrates an example electronic device providing scanning rate control of input components when a user is moving closer and farther away from the electronic device.

While electronic devices may detect proximity of a user, such proximity often lacks context that can inform the fine-grained operational adjustments to the devices. For example, a mobile phone may turn off its display and touchscreen functionality when the mobile phone detects the proximity of a user (e.g., when the phone is raised up to the user's ear). However, an electronic device can provide a more sophisticated user experience and finer-tuned power management by using distance-based contexts relating to proximity and user detection.

Many input components of an electronic device, such as a mobile phone or laptop computer, employ scanning technology to capture input. For example, touchscreens and touchpads, cameras and other light sensors, electronic styluses (particularly via their communications with a tablet computer), keyboards, microphones, and other input components employ sampling technologies that consume power when active. In one implementation, the sampling technology employs a scanning rate representing the number of times the input component registers, scans, or detects input per unit of time (e.g., per second). In one implementation, by managing the scanning rate of such input components of the electronic device based on user presence, the power consumption of the input components can be reduced. Scanning or sampling by a sensor consumes power, but the power consumption can be reduced by slowing the scanning rate, potentially at the expense of also slowing the device readiness (e.g., the device response time). By dynamically controlling the scanning rate as described herein, the system can at least partially balance power consumption and readiness needs based on the distance and/or the approach/retreat of a user.

Furthermore, input capture by such input components when a user is not present or is too far away to be intentionally providing input is undesirable because the input components can nonetheless detect unintended input, such as caused by a stack of papers falling on a keyboard, a cat walking across a touchscreen keyboard, an electronic stylus receiving a button press in a user's pocket, etc. Such false inputs can inadvertently increase the power consumption of the device by waking it up for no good reason (e.g., when a "wake on touch" feature is activated). Likewise, false inputs can execute unintended computer operations (e.g., inadvertently initiating a file deletion when a touchscreen keyboard key is activated by a roaming cat).

In addition, by discerning between more than two detection states (proximity detected or not), a device can power up its input components incrementally at different points as a user approaches. As such, detecting the presence of a user across the room may activate a different set of input functionalities than detecting the presence of a user sitting right in front of the device. For example, a computer may be configured to activate a microphone at a low scanning rate when a user is detected at a far distance (an example distance-based context)— if the user is "in frame," then there may be some interest by the user to have an active microphone but then again, maybe not. Accordingly, the low scanning rate may be sufficient to detect whether the user is addressing the voice-activation of the computer but not sufficient to capture audio in the room with high fidelity. If the user, however, is detected as approaching the computer (another example distance-based context), the scanning rate can be incrementally increased in anticipation of intended user interaction. Such selective scanning may be combined with other factors, such as evaluating any audio captured at the low scanning rate to determine whether the audio is in a frequency of a human voice. If so, then the scanning rate may be increased even with the user at a far distance.

In other implementations, the scanning rates of various input components may be incrementally and selectively increased as a user approaches, in anticipation of intended user interaction, and incrementally and selectively decreased as a user retreats, in anticipation of that the user is less likely to intend user interaction with the computer. For example, a computer may increase or decrease a touchscreen scanning rate depending on whether the user is detected within a distance range of about a human arm length. In contrast, the user may be using a keyboard that is farther away from the touchscreen, and so the computer may adjust the scanning rate of the keyboard based on a farther distance range than that of the touchscreen.

In addition, some implementations of the electronic device can detect motion of a user across its proximity sensor "field of view," such as when a colleague walks past the user's desk when the user is not present. By detecting a proximity event while determining that the detected object (i.e., the colleague) does not approach the electronic device, the device can differentiate between a user approaching toward or retreating from the electronic device versus a spurious user detection that should not trigger any input component operation changes. As such, distance-based contexts can help reduce false-positive detections, thereby saving power, for example, as colleagues navigate through an open-office environment.

It should be understood that the scanning rates of input components can be decreased to the point of making the component inactive (e.g., scanning rate decreases to zero samples per unit of time). In other implementations, scanning rates can simply be decreased (to a non-zero level) or increased in accordance with the detected distance-based contexts. Moreover, scanning rate adjustments can be made independently among different input devices of an electronic device based on distance-based contexts. Such configurations may be user or policy selected and refined.

Accordingly, distance-based user detection can selectively and incrementally adjust the scanning rate of input components to provide improved power efficiency, faster response times (e.g., powering up select input components of the device before the user actually sits down), and a more intelligent user experience than a simple proximity detection.

FIG. 1 illustrates an example electronic device 100 providing scanning rate control of input components when a user 102 is moving closer to (approaching) and farther away from (retreating) the electronic device 100. User presence detection coupled with distance detection, including "change in distance" detection, can detect the distance that a user (e.g., a human or other object) is from the electronic device 100 and whether the user is approaching toward or retreating from the electronic device 100. It should be understood that changes in distance can be identified by detected user presence in different discrete distance ranges and/or through incremental changes in distance measurements within such distance ranges. Furthermore, user presence can be detected using additional sensed conditions, including user behavior (e.g., typing on the keyboard, moving the mouse, other human-like behavior detectable by the system), facial and attention recognition, Bluetooth location detection, detection of noises associated with the presence of a user, and other user presence conditions.

A user detection sensor 104 detects the distance 110 of the user 102 from the sensor itself and monitors the change in distance between the user 102 and the user detection sensor 104. Examples of the user detection sensor 104 may include a variety of sensors capable of detecting the distance 110 of the user 102 over a reasonable office distance or some other functional distance, such as passive infrared (PIR) sensors, active IR time-of-flight-based sensors, acoustic sensors, Wi-Fi sensors, Bluetooth sensors, sonar-based location systems (e.g., using the device's audio systems), radar-based location systems (e.g., radiofrequency radar), image/facial recognition, etc. In other implementations, other distance-estimation-capable sensor systems may be employed. For example, some distance-estimation-capable sensor systems may employ time-of-flight computation to determine distance based on the time it takes for a signal originating at the device to bounce off the user and return to the sensor. Examples of time-of-flight sensor systems include infrared and acoustic sensors. In other examples, the strength of a Wi-Fi or Bluetooth signal communicated between the user and the device allows a distance estimation with sufficient precision. Other user and computer location functionality, including transmitter/receiver triangulation, may be employed to monitor the distance between a user and the device. Other parameters may be sensed to effect or assist with user presence detection, including without limitation the detected size/shape of a detected object, detected movement of a detected object, and reflectance characteristics of the object (e.g., skin reflectance), detected temperature of the object, and detection of facial features.

The distance 110 and the rate at which the distance increases or decreases can be communicated to a user tracking monitor 112 in the electronic device 100, which adjusts the scanning rate of input components of the electronic device 100 according to its configuration. For example, as the user 102 approaches, the scanning rate of a camera may turn on and/or increase; as the user 102 retreats, the scanning rate of the camera may decrease and even turn off in a specific distance-based context (e.g., when the user is no longer detected within the observable distance).

In FIG. 1, the user 102 is shown as reducing the distance to the computer, as shown by the rightmost arrow (approaching arrow 106), and increasing the distance to the computer (as shown by the leftmost arrow (retreating arrow 108). Accordingly, the change in distance 110 is reported to the user tracking monitor 112, which develops a distance-based context to adjust operations of the electronic device 100. Examples of distance-based contexts relevant to the illustration of FIG. 1 may include without limitation "approaching," "retreating," "retreating at a distance great than X," "approaching at a distance less than Y," and "stationary" (remaining within a predetermined distance range from the electronic device 100). Example operations may include without limitation increasing or decreasing the scanning rate of select input components of the electronic device 100 and transitioning hardware and/or software to or from a "ready" state.

Each distance measurement corresponds to one or more detection conditions (called "distance-based contexts"), which in turn may correspond to one or more scanning rates, power levels, and/or functionality states (collectively called "device states"). For example, when the presence of a user is first detected, the detection condition may transition from "monitoring no user presence" to "detecting appearance of a user." This transition results in a transition from a "Device State 0," which may be set to the lowest scanning rates in the input components, to "Device State 1," in which some input components are transitioned to a higher scanning rate (e.g., the scanning rate of the user detection sensor 104 may be increased in anticipation of the user's approach).

It should be understood that any distance-based context or device states may be influenced by detection probability (e.g., how high is the confidence that the detection is accurate and the detection condition is satisfied). See FIG. 4 for example distance-based contexts and device states.

From Device State 1, if the user is detected to be at a far distance (e.g., as defined by a distance greater than X), the user detection sensor 104 continues to monitor the distance between the user 102 and the electronic device 100 until the user 102 disappears (returning to Device State 0) or the user 102 approaches to a closer distance (e.g., as defined by a distance between X and a closer first intermediate distance Y), which causes the electronic device 100 to transition to Device State 2. Similar transitions can occur as the user 102 moves between different distance ranges to the electronic device 100.

Figure 2:
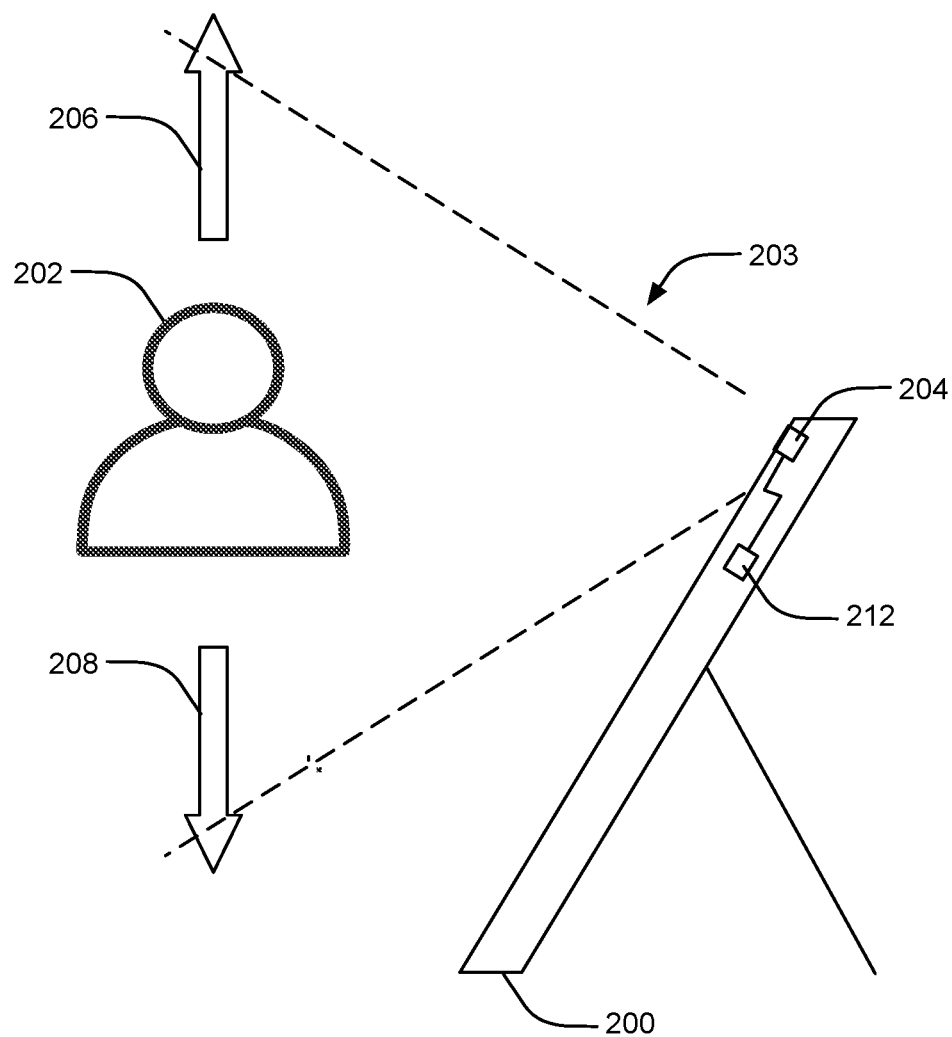
FIG. 2 illustrates an example electronic device providing scanning rate control of input components when a user is moving across the detection field of the electronic device.

FIG. 2 illustrates an example electronic device 200 providing scanning rate control of input components when a user 202 is moving across the detection field 203 of the electronic device 200, as shown by arrows 206 and 208. (Note: It may be easier to visualize the user's movement as in and out of the page, which suggests that the user is walking past a computer on a desk, rather than raising and lowering with respect to the computer, as suggested by the illustration in FIG. 2. Nevertheless, at least both scenarios are contemplated.) In this scenario, the distance between the user 202 and the electronic device 200 does not indicate an approaching or retreating context and, furthermore, does not generally indicate transitions between different distance ranges from the computer. Accordingly, such lateral motion, as opposed to approaching/retreating motion, detected by a user detection sensor 210 does not detect satisfaction of a detection condition other than "detecting appearance of a user," and the device state remains in the lowest device state in this scenario (or whichever device state corresponds to a user appearance within a given distance range). See FIG. 4 for example distance-based contexts and device states.

The distance between the user 202 and the user detection sensor 204 and the rate at which it increases or decreases can be communicated to a user tracking monitor 212 in the electronic device 200, which adjusts scanning rates used by input components of the electronic device 100, according to the configuration of the electronic device. In this scenario, the absence of detecting a context indicating approaching or retreating by a user may result in no adjustment to the operations of the electronic device 200. In some implementations, a sensor may be capable of detecting approaching/retreating movement and direction without reliance on discrete distance measurements, such as discrete time-of-flight measurements at two different points of the user's position.

It should be understood that the distance between the user 202 and the user detection sensor 204 does vary slightly as the angle between the user 202 and the user detection sensor 204 changes, but it is assumed, in the implementation shown in FIG. 2, that the distance ranges for different distance-based contexts can be configured to reduce incorrect transitions between device states. Furthermore, the rate at which the user approaches toward or retreats from the electronic device 200 can be another factor to indicate whether the electronic device 200 transitions from one device state to another, as a slow increase or decrease suggests a more lateral movement. In another implementation, the field of view of the electronic device 200 can be segmented (e.g., laterally and/or vertically) such that user movement between segments of the field of view may mitigate unintended transitions between distance-based contexts. Artificial intelligence may be used to fine-tune this segmentation approach.

Figure 3:
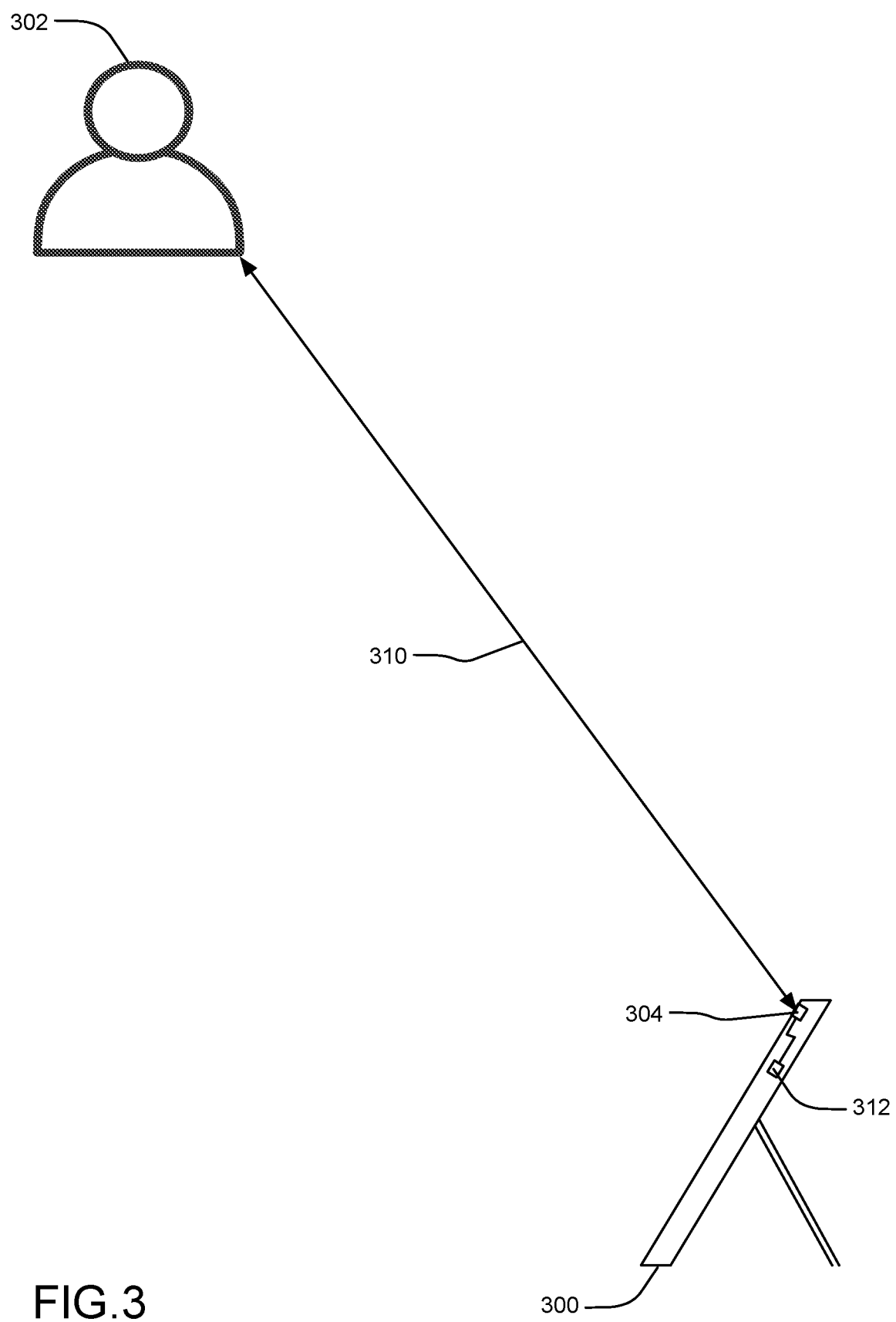
FIG. 3 illustrates an example electronic device providing scanning rate control of input components when a user remains at a far, yet detectable, distance from the electronic device.

FIG. 3 illustrates an example electronic device 300 providing scanning rate control of input components when a user 302 remains at a far, yet detectable, distance from the electronic device 300. In contrast to the examples in FIGS. 1 and 2, the user 302 has "appeared" (i.e., been detected by a user detection sensor 304 of the electronic device 300) but is relatively stationary (e.g., remaining within a predetermined distance range from the electronic device 300). For example, the user 302 has been detected but has not been detected as approaching or retreating with respect to the electronic device 300. In this scenario, the distance between the user 302 and the user detection sensor 304 and the zero or very low rate at which the distance increases or decreases can be communicated to a user tracking monitor 312 in the electronic device 300. Accordingly, the detection context may transition from "user not detected" to "user detected." This change in context may result in a transition of the device state from Device State 0 to Device State 1, which may, for example, increase the scan rate of the user detection sensor 304 to provide a faster response to other changes in the detection context, but it would likely not result in a transition to a "closer" device state. See FIG. 4 for example distance-based contexts and device states.

Figure 4:
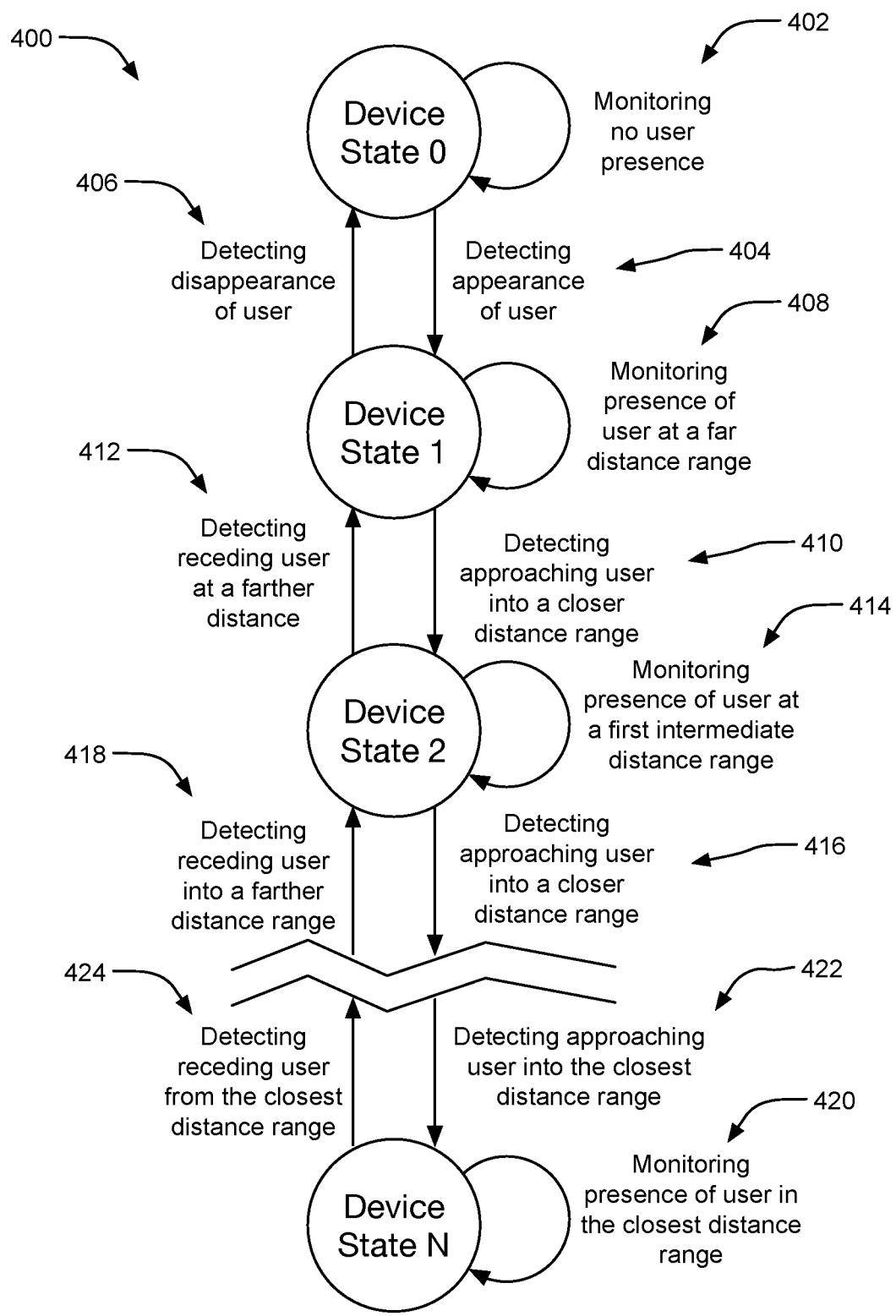
FIG. 4 illustrates a state diagram of an example electronic device providing scanning rate control of input components based on user presence detection.

FIG. 4 illustrates a state diagram 400 of an example electronic device scanning rate control of input components based on user presence detection. The state diagram 400 presents four specific device states (Device States 0–N), but the break between Device State 2 and Device State N indicates that the described technology contemplates more than four device states. In fact, the described technology contemplates three or more device states based on distance-based contexts. By providing more than two device states (e.g., more than simply on and off), an electronic device can provide incremental and/or selective changes in the scanning rates of input components based on changing distances from a detected user, thereby providing finer-grained control over power efficiency, user experience, and other device operations.

In FIG. 4, Device State 0 represents the scanning rate combination of input components of the electronic device, although other implementations may have a myriad of different operational device characteristics configured for a first device state, whether it is the lowest scanning rate combination or not. As shown by the "monitoring no user presence," the distance-based context 402 represents a condition in which a user is too far away to detect or is outside the device's field of view. As such, the device simply continues to monitor the environment for a user in the Device State 0. As used herein, the term "user presence state" refers to whether the user is detected or not in a given distance range from the user detection sensor.

Once the electronic device detects the appearance of a user, as shown by the distance-based context 404 in which the user has appeared within the detectable zone/distance range of the device. Having detected the appearance of a user, the electronic device transitions to the Device State 1, which, for example, may increase (or decrease in other implementations) the scanning rate of the user detection sensor, increase the scanning rate of one or more other input components, adjust power to output components, initiate certain background process, etc., as compared to Device State 0.

In Device State 1, a distance-based context 408 represents a condition in which the detected user is monitored as relatively stationary at a far distance (e.g., greater than a predetermined distance). While this detection condition holds, the electronic device remains in Device State 1. If the user disappears from detection, then the electronic device returns to Device State 0, per the distance-based context 406. Further, if the user is detected as approaching the electronic device (distance-based context 410), such as crossing to an intermediate distance from the electronic device, the electronic device transitions to the Device State 2, in which the scanning rates of select input components may be increased (or decreased in other implementations), thereby likely increasing the power consumption of the input components and the other hardware components of the electronic device that communicate with those components. In yet other implementations, select hardware and software processes may be readied for input and output (e.g., turning on a microphone, turning on a display at a low brightness), and/or other device operations are adjusted or initiated.

In Device State 2, a distance-based context 414 represents a condition in which the detected user is detected within a first intermediate distance range. While this condition holds, the electronic device remains in Device State 2. If the user is detected as retreating (moving away) from the electronic device into the far distance range, as per a distance-based context 412, then the electronic device returns to Device State 1. Further, if the user is detected as approaching the electronic device (per the distance-based context 416) so as to cross into a second intermediate distance range from the user detection sensor of the electronic device, the electronic device transitions to a "next" Device State (not shown), in which select input components may be configured to transition to a higher scanning rate. In addition, select software and hardware processes may be readied for input and output (e.g., turning on a microphone, turning on a display at a low brightness), and/or other device operations are adjusted or initiated. The electronic device may transition from the "next" Device State back to Device State 2 if the electronic device detects the user retreating back into the first intermediate distance range, per distance-based context 418.

A distance-based context 422, in which the user is detected as moving into the closest predetermined distance range, causes the electronic device to transition into a Device State N. Device State N represents a device state in which the distance-based context 420 indicates the user is being detected in the closest distance range. Typically, the Device State N would involve a device state of the highest scanning rate of its input components and therefore the highest power consumption and functionality, although this is configurable. In Device State N, the user is assumed to be positioned to use the electronic device to its fullest extent, so the most input components are fully activated. If the user is detected as retreating (moving away) from the electronic device out of the closest distance range, as per a distance-based context 424, then the electronic device returns to the preceding Device State.

As previously discussed, the described technology relates to managing more than two device states using distance-based context detected by a user detection sensor. As such, FIG. 4 should be interpreted as describing a number of device states where N>2. Furthermore, there may be intermediate device states between Device State 2 and Device State N.

Figure 5:
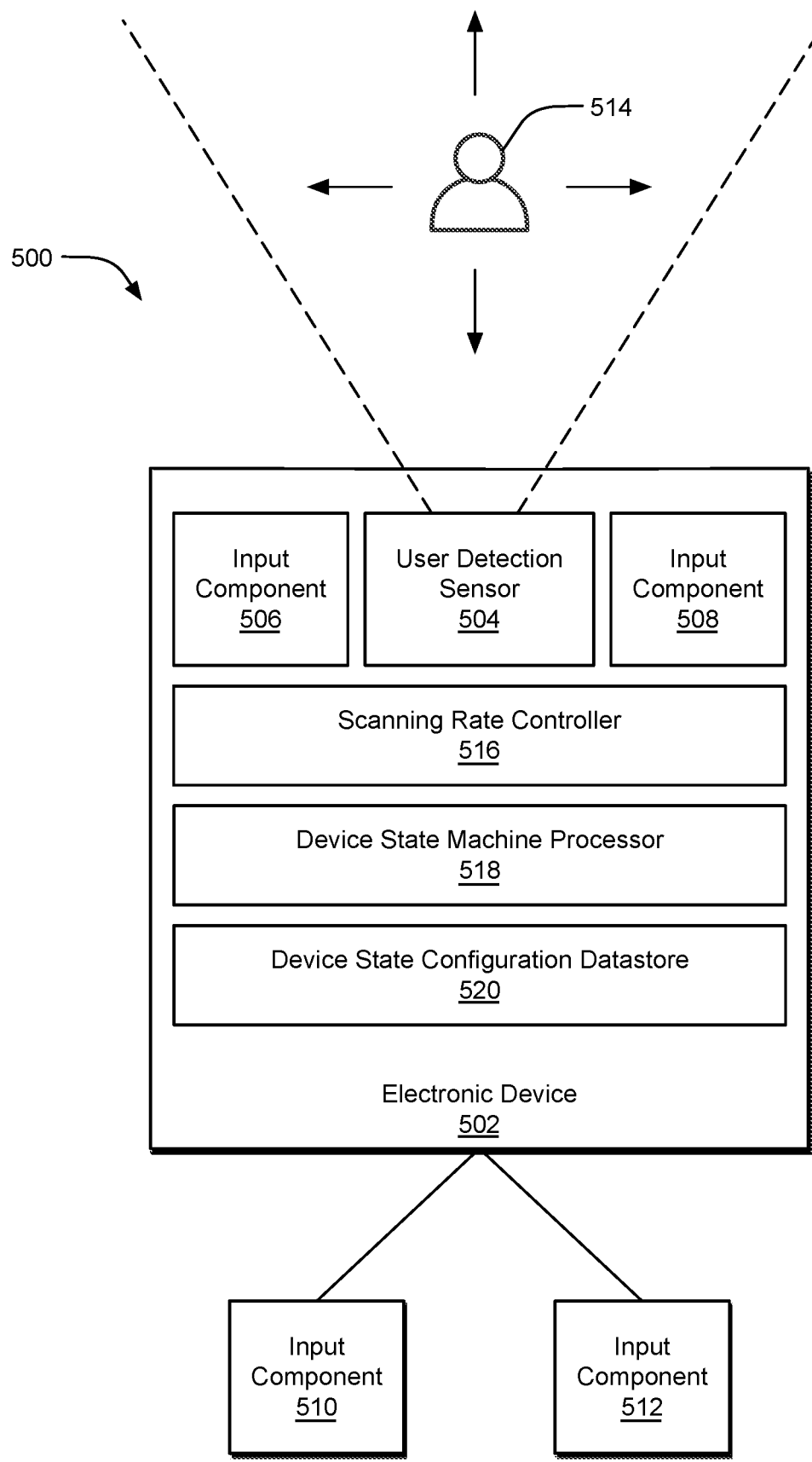
FIG. 5 illustrates components of an example electronic device system providing scanning rate control of input components based on user presence detection.

FIG. 5 illustrates components of an example electronic device system 500 providing scanning rate control of input components based on user presence detection. The electronic device system 500 includes at least an electronic device 502, a user detection sensor 504, and multiple input components. The user detection sensor 504 and the multiple input components are associated with the electronic device 502 by wired or wireless communication connections. The input components may be integral to the input components (as shown by an input component 506, an input component 506, and the user detection sensor 504, which is also a type of input component) or remote from the electronic device 502 (as shown by an input component 510 and an input component 512). All of the input components can communicate with the hardware device, whether integral to or remote from the electronic device 502. It should be understood that the user detection sensor 504 may also be remote from the electronic device 502 in some implementations. Example integral input components may include without implementation a touchscreen, a keyboard, a trackpad, an IR or RGB camera, a microphone, and a depth camera in a laptop. Example remote input components may include a Bluetooth keyboard, a Bluetooth trackpad, a USB-connected RGB camera, and an electronic stylus. The electronic device system 500 may also include various output components (not shown), whether integral or remote, including without limitation a display, a speaker, and a haptic mechanism.

The distance-based contexts detected by the user detection sensor relative to a user 514 are communicated to a scanning rate controller 516, which manages a device state machine processor 518 to manage transitions among the various device states supported by the electronic device 502. The scanning rates, distance ranges, approach/retreat speed parameters, and other configuration information are stored in a device state configuration datastore 520, which is accessible by the scanning rate controller 516 or the device state machine processor 518.

Figure 6:
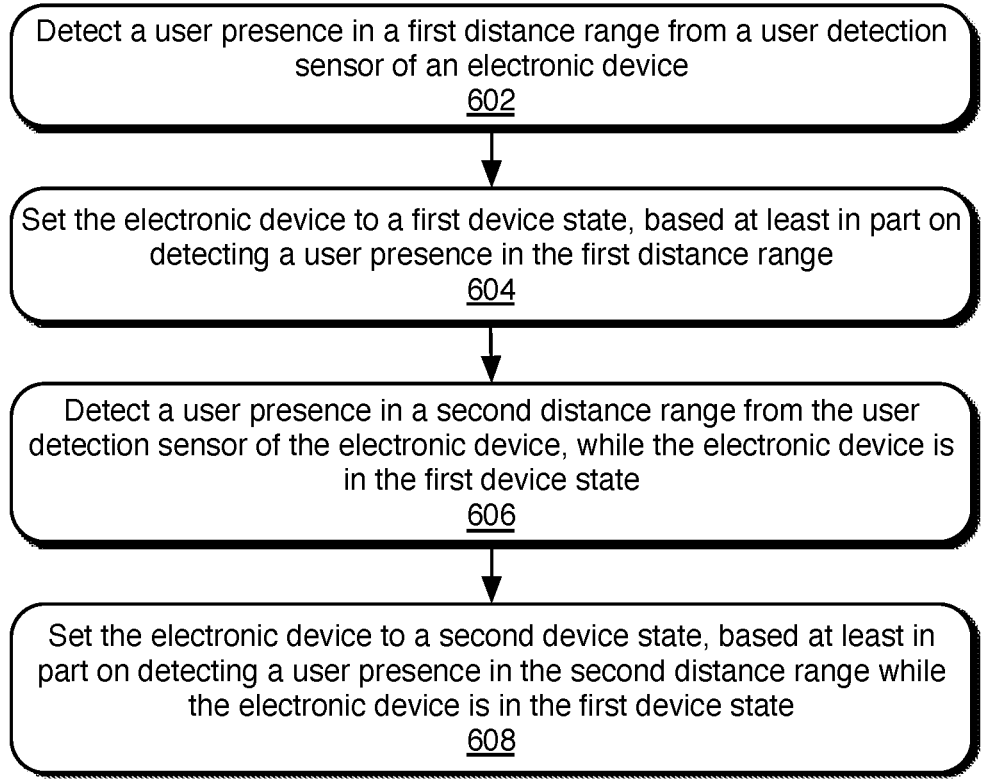
FIG. 6 illustrates example operations of an electronic device providing scanning rate control of input components based on user presence detection.

FIG. 6 illustrates example operations 600 of an electronic device providing scanning rate control of input components based on user presence detection. A detecting operation 602 detects a user presence in a first distance range from a user detection sensor of an electronic device. The electronic device is communicatively connectable to multiple input components, which may be integral or remote from the electronic device. A setting operation 604 sets the electronic device to a first device state, based at least in part on detecting a user presence in the first distance range. The first device state applies a scanning rate to a first input component of the multiple input components.

A subsequent detecting operation 606 detects a user presence in a second distance range from the user detection sensor of the electronic device while the electronic device is in the first device state. A subsequent setting operation 608 sets the electronic device to a second device state, based at least in part on detecting a user presence in the second distance range while the electronic device is in the first device state. The second device state applies a different scanning rate to the first input component than in the first device state.

For example, a scanning rate of an input component in a first device state may be higher than a scanning rate of the input component in a second device state. In one implementation, this scenario may result in an increase in power consumed by the input component as the device state changes (e.g., as the user approaches the electronic device). In contrast, a scanning rate of an input component in a first device state may be lower than a scanning rate of the input component in a second device state. In one implementation, this scenario may result in a decrease in power consumed by the input component as the device state changes (e.g., as the user retreats from the electronic device). Accordingly, by monitoring distance-based contexts relating to a user and the electronic device, a scanning rate controller can adjust the scanning rates of one or more input components to manage the power consumption of the electronic device in a variety of user circumstances.

Figure 7:
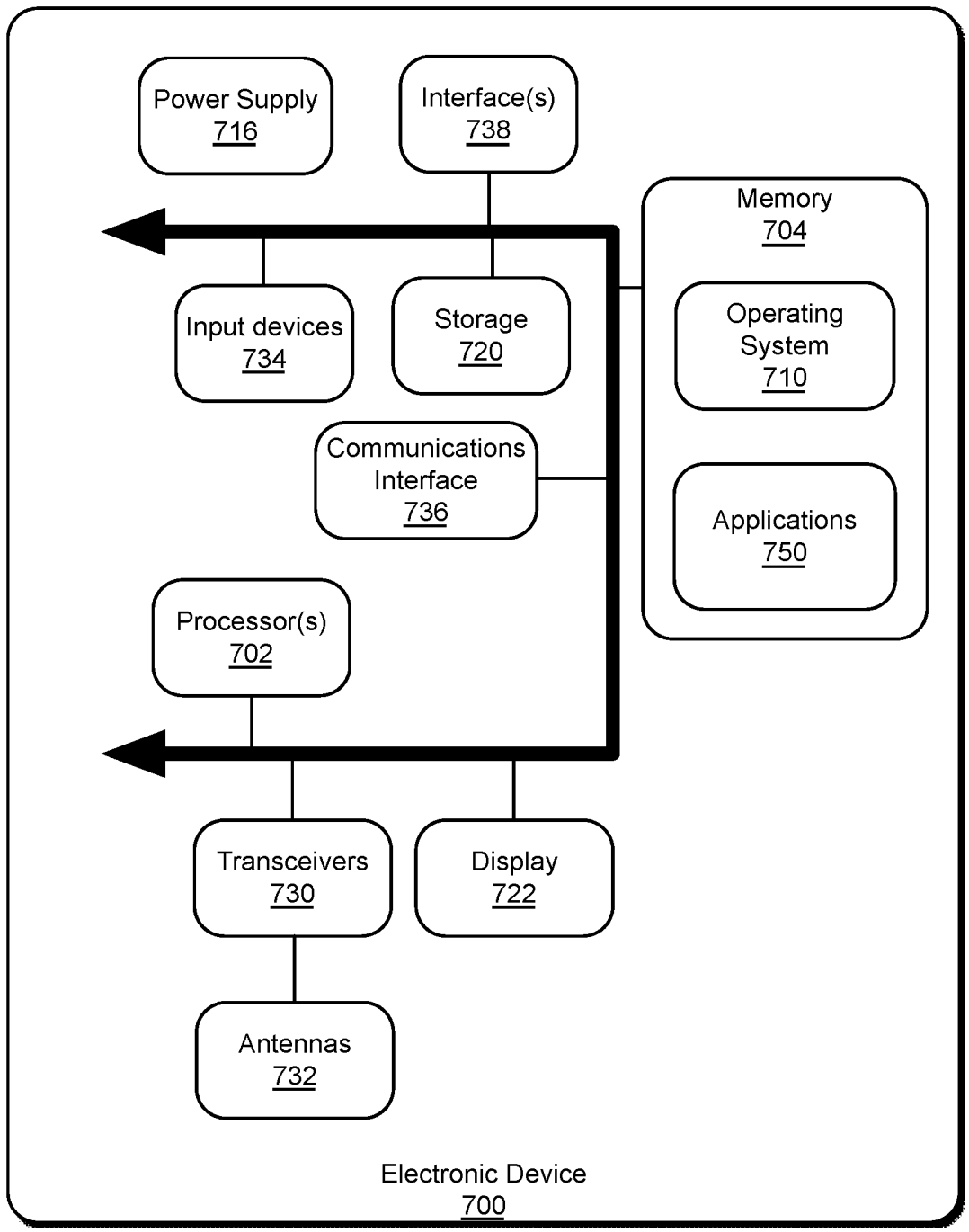
FIG. 7 illustrates an example electronic device that can provide one or more aspects of scanning rate control of input components based on user presence detection.

FIG. 7 illustrates an example electronic device that can provide one or more aspects of scanning rate control of input components based on user presence detection. The electronic device 700 may be a client device, such as a laptop, mobile device, desktop, tablet, or a server/cloud device. The electronic device 700 includes one or more processor(s) 702, and a memory 704. The memory 704 generally includes both volatile memory (e.g., RAM) and nonvolatile memory (e.g., flash memory). An operating system 710 resides in the memory 704 and is executed by the processor(s) 702.

In an example electronic device 700, as shown in FIG. 7, one or more modules or segments, such as applications 750; all or part of input components, such as a user detection sensor; a scanning rate controller; a device state machine processor; and other modules are loaded into the operating system 710 on the memory 704 and/or storage 720 and executed by processor(s) 702. In other implementations, one or more of the scanning rate controller and the device state machine processor may be implemented in hardware. The storage 720 may store user detection sensor measurements, a device state machine, device state configuration data, and other data and be local to the electronic device 700 or may be remote and communicatively connected to the electronic device 700.

The electronic device 700 includes a power supply 716, which is powered by one or more batteries or other power sources and which provides power to other components of the electronic device 700. The power supply 716 may also be connected to an external power source that overrides or recharges the built-in batteries or other power sources.

The electronic device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The electronic device 700 may further include a network adapter 736, which is a type of communication device. The electronic device 700 may use the adapter and any other types of communication devices for establishing connections over a wide-area network (WAN) or local-area network (LAN). It should be appreciated that the network connections shown are exemplary and that other communications devices and means for establishing a communications link between the electronic device 700 and other devices may be used.

The electronic device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The electronic device 700 may further include a display 722, such as a touch screen display.

The electronic device 700 may include a variety of tangible processor-readable storage media and intangible processor-readable communication signals. Tangible processor-readable storage can be embodied by any available media that can be accessed by the electronic device 700 and includes both volatile and nonvolatile storage media, removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the electronic device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method includes detecting a user presence in a first distance range from a user detection sensor of an electronic device. The electronic device is communicatively connectable to multiple input components. The electronic device is set to a first device state, based at least in part on detecting a user presence in the first distance range, wherein the first device state applies a scanning rate to a first input component of the multiple input components. A user presence is detected in a second distance range from the user detection sensor of the electronic device while the electronic device is in the first device state. The electronic device is set to a second device state, based at least in part on detecting a user presence in the second distance range while the electronic device is in the first device state, wherein the second device state applies a different scanning rate to the first input component than in the first device state. One or more benefits of this described technology include using the scanning rate of an input component of an electronic device to reduce power consumption by the electronic device when not in use and increase power consumption and readiness to a more rapid response time when a user approaches the electronic device to use it.

Another example method of any preceding method is provided, further including adjusting the first input component from the first scanning rate to the second scanning rate adjusts the power consumption of the first input component of the electronic device. One or more benefits of this described technology include reducing or increasing power consumption and decreasing or increasing system readiness based on a distance-based context relating to a user. In some implementations, decreasing scanning rates can decrease the power consumption of the electronic device, although it may also decrease the system readiness. In contrast, increasing scanning rates can increase the power consumption of the electronic device, although it may also increase the system readiness.

Another example method of any preceding method is provided, wherein the first input component includes a user detection sensor configured to perform the detecting operations, wherein the scanning rate of the user detection sensor in the first device state is different than in the second device state. One or more benefits of this described technology include reducing or increasing power consumption based on a distance-based context relating to a detected user and adjusting power consumption by adjusting a scanning rate for an input component.

Another example method of any preceding method is provided, wherein detection of a user presence in the first distance range, followed by detection of a user presence in the second distance range, indicates an approach by a user toward the electronic device. One or more benefits of this described technology include increasing device readiness to a more rapid responses time when a detected user is approaching.

Another example method of any preceding method is provided, wherein the approach by the user toward the electronic device corresponds to an increase in the scanning rate for the first input component of the electronic device. One or more benefits of this described technology include increasing device readiness to a more rapid responses time when a detected user is approaching.

Another example method of any preceding method is provided, wherein detection of a user presence in the first distance range, followed by detection of a user presence in the second distance range, indicates a retreat by a user from the electronic device. One or more benefits of this described technology include decreasing power consumption of the electronic device when a detected user is retreating.

Another example method of any preceding method is provided, wherein the retreat by the user from the electronic device corresponds to a decrease in the scanning rate for the first input component of the electronic device. One or more benefits of this described technology include decreasing power consumption of the electronic device when a detected user is retreating.

Another example method of any preceding method is provided, further including detecting a user presence in a third distance range from the user detection sensor of the electronic device, while the electronic device is in the second device state, and setting the electronic device to a third device state, based at least in part on detecting a user presence in the third distance range while the electronic device is in the second device state, wherein the third device state applies a scanning rate to the first input component that is different than the scanning rates in the first and second device states. One or more benefits of this described technology include providing multiple levels of power consumption and readiness depending on how close the detected user is to the electronic device.

Another example method of any preceding method is provided, wherein the first device state applies a scanning rate to a second input component of the input components of the electronic device, and the second device state applies a scanning rate to a second input component that is different than the scanning rate applied to the second input component in the first device state. One or more benefits of this described technology include increasing confidence in a distance-based context by using detection results by multiple sensors.

Another example method of any preceding method is provided, wherein the first device state applies a power level to an output component of the electronic device and the second device state applies a power level to the output component that is different than the power level applied to the output component in the first device state. One or more benefits of this described technology include adjusting the power consumption of the electronic device based on distance-based contexts by adjusting the power consumption of an output component of the electronic device.

An example electronic device includes a power supply and a user detection sensor configured to detect a user presence in a first distance range from the user detection sensor of the electronic device. The electronic device is communicatively connectable to multiple input components. The electronic device also includes scanning rate controller circuitry powered by the power supply and configured to set the electronic device to a first device state, based at least in part on detecting a user presence in the first distance range. The first device state applies a scanning rate to a first input component of the multiple input components. The user detection sensor is further configured to detect a user presence in a second distance range from the user detection sensor of the electronic device, while the electronic device is in the first device state. The scanning rate controller circuitry is further configured to set the electronic device to a second device state, based at least in part on detecting a user presence in the second distance range while the electronic device is in the first device state, wherein the second device state applies a different scanning rate to the first input component than in the first device state.

Another example electronic device of any previous device is provided, wherein adjusting the first input component from the first scanning rate to the second scanning rate adjusts the power consumption of the first input component of the electronic device.

Another example electronic device of any previous device is provided, wherein the first input component includes a user detection sensor configured to perform the detecting operations, wherein the scanning rate of the user detection sensor in the first device state is different than in the second device state.

Another example electronic device of any previous device is provided, wherein detection of a user presence in the first distance range, followed by detection of a user presence in the second distance range, indicates an approach by a user toward the electronic device.

Another example electronic device of any previous device is provided, wherein the approach by the user toward the electronic device corresponds to an increase in the scanning rate for the first input component of the electronic device.

Another example electronic device of any previous device is provided, wherein detection of a user presence in the first distance range, followed by detection of a user presence in the second distance range, indicates a retreat by a user from the electronic device.

Another example electronic device of any previous device is provided, wherein the retreat by the user from the electronic device corresponds to a decrease in the scanning rate for the first input component of the electronic device.

Another example electronic device of any previous device is provided, wherein the user detection sensor is further configured to detect a user presence in a third distance range from the user detection sensor of the electronic device, while the electronic device is in the second device state, and the scanning rate controller circuitry is further configured to set the electronic device to a third device state, based at least in part on detecting a user presence in the third distance range while the electronic device is in the second device state, wherein the third device state applies a scanning rate to the first input component that is different than the scanning rates in the first and second device states.

Another example electronic device of any previous device is provided, wherein the first device state applies a scanning rate to a second input component of the input components of the electronic device, and the second device state applies a scanning rate to a second input component that is different than the scanning rate applied to the second input component in the first device state.

One or more example tangible processor-readable storage media embodied with instructions for executing on one or more processors and circuits of an electronic device a process of scanning rate control for input components based on user presence detection. The process includes detecting a user presence in a first distance range from a user detection sensor of an electronic device. The electronic device is communicatively connectable to multiple input components. The process further includes setting the electronic device to a first device state, based at least in part on detecting a user presence in the first distance range. The first device state applies a scanning rate to a first input component of the multiple input components. The process further includes detecting a user presence in a second distance range from the user detection sensor of the electronic device, while the electronic device is in the first device state and setting the electronic device to a second device state, based at least in part on detecting a user presence in the second distance range while the electronic device is in the first device state, wherein the second device state applies a different scanning rate to the first input component than in the first device state, wherein adjusting the first input component from the first scanning rate to the second scanning rate adjusts the power consumption of the first input component of the electronic device.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method comprising:
    detecting, by a user detection sensor, a user presence in a first distance range from the user detection sensor of an electronic device, the electronic device being communicatively connectable to multiple input components and the user detection sensor;
    setting the electronic device to a first device state, based at least in part on detecting a user presence in the first distance range, wherein the first device state applies a scanning rate to a first input component of the multiple input components;
    detecting, by a user detection sensor, a user presence in a second distance range from the user detection sensor of the electronic device, while the electronic device is in the first device state; and
    setting the electronic device to a second device state, based at least in part on detecting a user presence in the second distance range while the electronic device is in the first device state, wherein the second device state applies a different scanning rate to the first input component than in the first device state.

2. The method of claim 1, wherein adjusting the first input component from the scanning rate to the different scanning rate adjusts power consumption of the first input component of the electronic device.

3. The method of claim 1, wherein the scanning rate of the user detection sensor in the first device state is different than in the second device state.

4. The method of claim 1, wherein detection of a user presence in the first distance range, followed by detection of a user presence in the second distance range, indicates an approach by a user toward the electronic device.

5. The method of claim 4, wherein the approach by the user toward the electronic device corresponds to an increase in the scanning rate for the first input component of the electronic device.

6. The method of claim 1, wherein detection of a user presence in the first distance range, followed by detection of a user presence in the second distance range, indicates a retreat by a user from the electronic device.

7. The method of claim 6, wherein the retreat by the user from the electronic device corresponds to a decrease in the scanning rate for the first input component of the electronic device.

8. The method of claim 1, further comprising:
    detecting a user presence in a third distance range from the user detection sensor of the electronic device, while the electronic device is in the second device state; and
    setting the electronic device to a third device state, based at least in part on detecting a user presence in the third distance range while the electronic device is in the second device state, wherein the third device state applies a scanning rate to the first input component that is different than the scanning rates in the first and second device states.

9. The method of claim 1, wherein the first device state applies a scanning rate to a second input component of the input components of the electronic device, and the second device state applies a scanning rate to the second input component that is different than the scanning rate applied to the second input component in the first device state.

10. The method of claim 1, wherein the first device state applies a power level to an output component of the electronic device and the second device state applies a power level to the output component that is different than the power level applied to the output component in the first device state.

11. An electronic device comprising:
a power supply;
a user detection sensor configured to detect a user presence in a first distance range from the user detection sensor of the electronic device, the electronic device being communicatively connectable to multiple input components and the user detection sensor; and
scanning rate controller circuitry powered by the power supply and configured to set the electronic device to a first device state, based at least in part on detecting a user presence in the first distance range, wherein the first device state applies a scanning rate to a first input component of the multiple input components,
wherein the user detection sensor is further configured to detect a user presence in a second distance range from the user detection sensor of the electronic device, while the electronic device is in the first device state, and
the scanning rate controller circuitry is further configured to set the electronic device to a second device state, based at least in part on detecting a user presence in the second distance range while the electronic device is in the first device state, wherein the second device state applies a different scanning rate to the first input component than in the first device state.

12. The electronic device of claim 11, wherein adjusting the first input component from the scanning rate to the different scanning rate adjusts power consumption of the first input component of the electronic device.

13. The electronic device of claim 11, wherein the scanning rate of the user detection sensor in the first device state is different than in the second device state.

14. The electronic device of claim 11, wherein detection of a user presence in the first distance range, followed by detection of a user presence in the second distance range, indicates an approach by a user toward the electronic device.

15. The electronic device of claim 14, wherein the approach by the user toward the electronic device corresponds to an increase in the scanning rate for the first input component of the electronic device.

16. The electronic device of claim 11, wherein detection of a user presence in the first distance range, followed by detection of a user presence in the second distance range, indicates a retreat by a user from the electronic device.

17. The electronic device of claim 16, wherein the retreat by the user from the electronic device corresponds to a decrease in the scanning rate for the first input component of the electronic device.

18. The electronic device of claim 11, wherein the user detection sensor is further configured to detect a user presence in a third distance range from the user detection sensor of the electronic device, while the electronic device is in the second device state, and
the scanning rate controller circuitry is further configured to set the electronic device to a third device state, based at least in part on detecting a user presence in the third distance range while the electronic device is in the second device state, wherein the third device state applies a scanning rate to the first input component that is different than the scanning rates in the first and second device states.

19. The electronic device of claim 11, wherein the first device state applies a scanning rate to a second input component of the input components of the electronic device, and the second device state applies a scanning rate to the second input component that is different than the scanning rate applied to the second input component in the first device state.

20. One or more tangible processor-readable storage media embodied with instructions for executing on one or more processors and circuits of an electronic device a process, the process comprising:
detecting, by a user detection sensor, a user presence in a first distance range from the user detection sensor of the electronic device, the electronic device being communicatively connectable to multiple input components and the user detection sensor;
setting the electronic device to a first device state, based at least in part on detecting a user presence in the first distance range, wherein the first device state applies a scanning rate to a first input component of the multiple input components;
detecting, by a user detection sensor, a user presence in a second distance range from the user detection sensor of the electronic device, while the electronic device is in the first device state; and
setting the electronic device to a second device state, based at least in part on detecting a user presence in the second distance range while the electronic device is in the first device state, wherein the second device state applies a different scanning rate to the first input component than in the first device state, wherein adjusting the first input component from the first scanning rate to the second scanning rate adjusts power consumption of the first input component of the electronic device.

* * * * *